United States Patent [19]
Schlichte

[11] 3,971,892
[45] July 27, 1976

[54] TIMING APPARATUS FOR PCM/TDM SWITCHING NETWORKS

[75] Inventor: Max Schlichte, Munich, Germany

[73] Assignee: Siemens Aktiengesellschaft, Berlin & Munich, Germany

[22] Filed: Apr. 21, 1975

[21] Appl. No.: 569,660

[30] Foreign Application Priority Data
Apr. 22, 1974 Germany............................ 2419251

[52] U.S. Cl. ............................................ 179/15 BA
[51] Int. Cl.² ........................................ H04Q 11/00
[58] Field of Search................... 179/15 BA, 15 AQ

[56] References Cited
UNITED STATES PATENTS

| | | | |
|---|---|---|---|
| 3,715,505 | 2/1973 | Gordon et al.................. | 179/15 AQ |
| 3,761,894 | 9/1973 | Pilc et al........................ | 340/172.5 |
| 3,903,370 | 9/1975 | Carbrey et al.................. | 179/15 AT |

*Primary Examiner*—Thomas W. Brown

[57] ABSTRACT

A timing circuit for use in pulse code modulation, time division multiplex switching networks is described. The switching networks are a part of a time division multiplex telecommunication system wherein each call uses the same time slot on the incoming and outgoing lines. The timing circuit has a number of word-organized storage locations equal to the number of PCM words per pulse frame and an equal number of address memory locations individually assigned to the aforementioned storage locations. The word-organized storage locations are found by blocks of shift registers connected in series. Each block in the series is connected over the non-operating positions or rest positions of pairs of simultaneously actuated switches to the next succeeding block. In their operating positions the switches connect the shift registers to the conductors of a service trunk system. The address memory locations are formed from a second series-connected shift register group connected to form a ring. Bit comparators compare the contents of the second shift register stages to a timing circuit carrying the time position code identifying the time slot in question. When all the bits of the time position code are equal to corresponding bits of the time slot address, the control inputs of the pair of aforementioned switches located at the output of the allocated word-organized storage are actuated, changing these switches to their operating positions.

2 Claims, 1 Drawing Figure

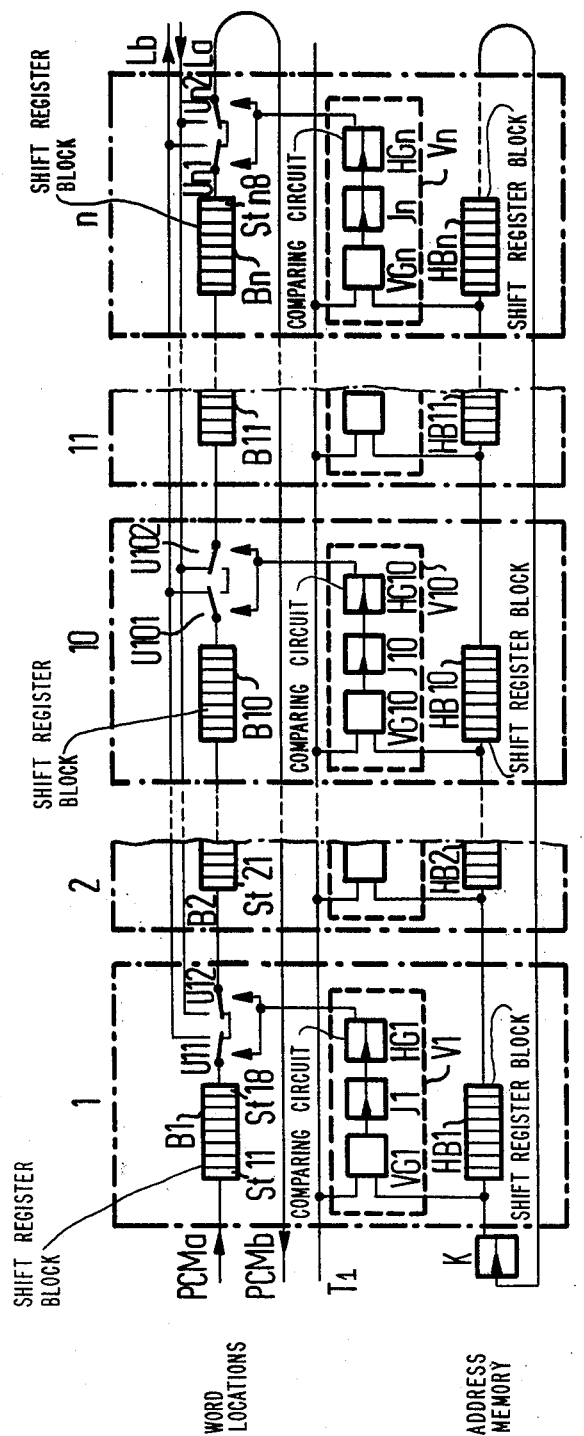

TIMING APPARATUS FOR PCM/TDM SWITCHING NETWORKS

BACKGROUND OF THE INVENTION

The invention relates to timing apparatus for pulse code modulation, time division multiplex (PCM/TDM) switching networks having a number of word-organized storage locations equal to the number of PCM words per sampling pulse frame and an equal number of address memory locations individually assigned thereto for storing the addresses of the time slots during which the PCM information words retained temporarily in the word-organized storage locations shall be retransmitted.

Timing apparatus having the above characteristics has come into useage in the form of an associative storage (West German Offenlegungsschrift 2 158 683). Contrary to conventional digital data storages, there are no addresses serving exclusively for the identification of a memory location in an associative storage. Rather, the stored data themselves, or address data assigned to the useful data, (which may thus be considered as part of the stored data) assume the role usually performed by addresses. When searching for an item of information, an address word is simultaneously sent to all storage locations so that the searched item can immediately be found. Thus, the sequence in which the individual items are entered into such an associative storage is no longer of significance.

The use of such associative storages makes extensive decentralization of the PCM/TDM switching networks possible, since the use thereof enables the construction of modules allocated to the individual PCM trunks which are autonomous as far as their control is concerned (cf. West German Offenlegungsschrift 2 158 683).

The possibility of working with decentralized modules forming self-contained parts of the system offers great advantages when used with large-scale integrated circuits (LSI), because of the very small size of the components, the very low power dissipation, the great operational reliability of the components, and the small amount of inter-unit wiring between the components. Likewise, the use of a conventional associative timing circuit referenced above (West German Offenlegungsschrift 2 158 683) is suitable for implementation in large-scale integration, as far as its control autonomy is concerned. However, in order to operate such a timing circuit a serial-parallel conversion of the PCM words must be carried out prior to the actual time slot conversion.

The time needed for such conversion is particularly disturbing in conjunction with the integrated circuit design, because the operating speed of the components of such integrated circuits is from the outset lower than that of discrete components. Owing to the parallel representation of the PCM words, these circuit configurations necessitate many output leads. This, in addition to the single-use components that must be operated for the production means of such circuits, affects most frequently the cost factor.

Furthermore, the conventional timing apparatus does not admit of complementary operation, i.e., it is not possible to utilize one and the same memory location for both routes of data transmission.

An object of the invention is, therefore, to provide a timing apparatus that is particularly suited for implementation in large-scale integration, while obviating the problems referenced hereinabove.

SUMMARY OF THE INVENTION

In accordance with the invention, the foregoing and other objects are achieved in that in the timing apparatus of the type mentioned hereinabove the word-organized storage locations are series-connected shift register blocks of a first shift register. The input to the first shift register of the block following in the sequence is connected through the series-connected non-operation breaks of a pair of simultaneously actuated switches to the output of the block preceding in the sequence, except for the first block whose input is permanently in communication with the incoming pair of conductors of a TDM trunk, and except for the last block whose output is permanently in communication with the outgoing pair of conductors of the TDM trunk.

The invention is further characterized in that the operating break of either of the switches of the pairs lies between the output of a block and the outgoing wire pairs of a serving-trunk system, and the operating breaks of the other switches of the pairs lie between the input of the following block and the incoming wire pairs of the serving-trunk system.

The address memory locations of series-connected shift register blocks of a second shift register, which is closed to form a ring, and whose inputs are each connected to one input of a bit comparator circuit allocated to individual blocks (the other input of the bit comparator circuit being connected to a timing circuit common to all the address memory locations and carrying the time-position code identifying the channel time position in question) and whose signal-transmitting output, when all the bits of the time-position code are in agreement with the corresponding bits of the time-slot address, is connected to the control inputs of the switches of the pair disposed at the output of the allocated word-organized storage location.

The use of shift registers as word-organized storages and as address memories is particularly favorable for implementation in large-scale integration. The interconnection of the shift register blocks according to the invention or the connection of their outputs and inputs to the pairs of wires of a serving-trunk system enables, as planned, the full complementary utilization of the word-organized storage locations for both transmission directions. Moreover, fewer logic functions are needed owing to the bit-by-bit comparison of the address data with the bits of the time-position code words. The logic functions take place concurrently so that it is possible to economize on components or to reduce the total surface required for the large-scale integrated circuits.

BRIEF DESCRIPTION OF THE DRAWING

The principles of the invention will be more readily understood by reference to the description of a preferred embodiment given hereinbelow in conjunction with the single FIGURE drawing, which is a schematic diagram of a timing circuit constructed according to the invention.

DETAILED DESCRIPTION OF THE DRAWING

The timing circuit for PCM/TDM switching networks constructed according to the invention and illustrated in the drawing is divided into $n$ subgroups in accordance with the number of time slots per sampling pulse frame, i.e., in the case of the conventional PCM/TDM system into 32 subgroups. The word locations of all the subgroups form a first shift register. Thus, in the case of 8-bit PCM words, they are constructed as shift register blocks B1 to Bn having 8 shift register steps St1 to St8 each.

As a rule, the outputs of the last shift register step of a shift register blocking preceding in the sequence are connected by the series-connected non-operation breaks of a pair of simultaneously actuated switches to the input of the first shift register step of the following shift register block. For example, there exists over the non-operation positions of the switches U11 and U12 associated with the subgroup 1 a connection of the output of the last shift register step St18 of the first shift register block B1 to the input of the first shift register step St21 of the second shift register block B2, etc.

There is only one exception at the input of the shift register block B1 and at the output of the shift register block Bn. The former is connected to the incoming pair of conductors PCMa of the TDM trunk connected directly to the timing circuit, while the latter is in communication with the outgoing pair of conductors PCMb of the same TDM trunk.

The operating positions of the switches of the pairs of switches, i.e., of the switches U11 . . . Un1, connect the appropriate block outputs. They are disposed between the outputs of the last shift register steps St18 to Stn8 and the pair of conductors Lb of a service trunk system common to all the word-organized storage locations. A connection is established over the service trunk system to a space-division switching matrix stage (not shown) of the PCM/TDM switching network for which the timing circuit according to the invention is to be employed.

The operating positions of the other switches U12, U22 . . . Un of the pairs of switches connect the inputs of the following shift register blocks B2 to Bn and the incoming pair of wires La of the service trunk system. For example, the operating break of the switch U12 of the first pair of switches is located between the input of the first shift register block B2 following the first shift register block B1 and the pair of wires La. An exception is the other switch Un2 of the last pair of switches which is located between the incoming pair of wires La of the service trunk system and between the outgoing pair of wires PCMb of the connected TDM trunk.

The address memory locations of the timing apparatus constructed according to the invention are, likewise, shift register blocks HB1 to HBn, which are series-connected and thus form a second shift register. The second shift register is closed over a bistable circuit K to form a ring in the manner of a delay line storage.

The inputs to the shift register blocks HB1 to HBn are each connected to one input of a bit comparator circuit allocated to individual blocks. For example, there is a connection between the input of the shift register block HB1 and one input of the bit comparator circuit V1 assigned thereto. The other inputs of the bit comparator circuits V1 to Vn are connected to a timing circuit T1 common to all the address memory locations and which throughout the operation carries a time-position code identifying the time-slot position concerned. The outputs of the bit comparator circuits are each connected to the control inputs of the switch of the pair disposed at the output of the allocated word-organized storage location. For example, there exists a connection between the output of the comparator circuit V1 and the control inputs of the switches U11 and U12 located at the output of the word-organized storage location B1.

The mode of operation of the timing apparatus according to the invention will be explained hereinbelow.

By means of a control unit (not shown) of the TDM switching center with which the timing apparatus according to the invention is associated, there is allocated to each PCM word supplied over the incoming pair of wires PCMa of the TDM trunk connected to the timing circuit the address of a time slot over which PCM word shall be retransmitted. Thus, assuming that PCM words incoming in the timing circuit over the incoming pair of wires PCMa in the time slot 10 shall be retransmitted in the time slot 20, then the address of the time slot 20 is written, through appropriately repeated setting and resetting of the bistable circuit K, upon the entrance of such a PCM word for the first time in the word location formed by the shift register block B1 during the time position corresponding to the time slot 10.

If one assumes a TDM telecommunication system with 32 time slots, then a code with only five code character elements suffices for the representation of the time addresses, but in the preferred embodiment shown the shift register blocks HB1 to HBn have 8 shift register steps each for the retention of the time-slot addresses. Thus, besides the bits forming the time-slot address word, 3 bits can be entered in the shift register blocks; one of these bits is used for setting the subsequent integral element I1 to In via the actual comparing unit VG1 to VGn of the comparator circuits V1 to Vn prior to the start of a bit comparison. The second of the bits is used to cause the transfer of the contents of the integral elements I1 to In by the subsequent holding element HB1 to HGn upon completion of the comparison. The third of these bits causes the resetting of the integral element.

The PCM word entered serially in the first register block of the word-organized storage from the incoming pair of wires PCMa of the TDM trunk is now transferred serially over the non-operation positions of the switches U11 and U12 to the second register block B2 of the word-organized storage. Both switches U11 and U12 are not actuated because, as indicated above, in the shift register block HB1 of the address memory the address of the time slot 20 has entered and because, at this time, the time slot address of the time slot 10 appears on the timing circuit. There is, thus, no agreement between the two The comparing unit VG1 of the comparator circuit V1, at least with one pair of the compared bits, will establish the absence of agreement so that the integral element I1 is set and, hence, at the end of the comparison, no positive comparison result can be transferred to the holding element.

The time slot address word of the time slot 20 is, likewise, transferred serially to a following shift register block, i.e., to block HB2 of the second shift register.

The further shifting of the information word of the time slot 10 within the first shift register and, hence, the temporary storage thereof, as well as the further shifting of the time slot address word of the time slot 20 within the second shift register will in the instance described herein be continued until said words have reached the shift register blocks of the subgroup 10. This arises out of the fact that when the time slot address word of the time slot 20 has reached the block HB10 of the second shift register (which takes place 10 time slot positions after the entrance of said address word in the first shift register block HB1), the time-slot address of the time slot 20 will also be transferred over the timing circuit T1. Thus, the integral element I10 of the comparator circuit V10 of the subgroup is not reset until the appearance of the transfer clock pulse to the holding element HG10. Thus, the holding element can be set, thereby actuating the switches U101 and U102, which take their operating positions. The information word originally supplied at the time slot 10 on the incoming pair of wires PCMa of the TDM trunk thus leaves the shift register block B10 of the first shift register via the operating position of the switch U101, and reaches the outgoing pair of wires Lb of the service trunk system. The PCM word incoming at the time slot 10 on the PCM trunk is thus retransferred at the time slot 20 on the service trunk system.

Since, as assumed, during one and the same call on associated outgoing and incoming pairs of PCM trunks the same time slot is used, the PCM word transferred in the backward direction via the operating break of the switch 101 from the incoming pair of wires La of the service trunk system enters the storage word shift register block B11 of the following subgroup 11 concurrently with the readout from the storage block 10. Thereupon, the PCM word incoming in the backward direction from the service trunk system is shifted further in accordance with the procedures described hereinabove from shift register block to shift register block until it is transferred via the non-operation breaks of the switches Un1, Un2 of the last subgroup $n$ to the outgoing pair of wires PCMb of the TDM trunk. This takes place 32 time slots later ($n$=32), taking as a basis a 32-time-slot telecommunication system. It takes place during the position of time slot 10 occurring in the succeeding sampling pulse. The same time slot is used for one and the same call on the TDM trunk both on the incoming pair of wires PCMa and on the outgoing pair of wires PCMb. These same conditions also apply when $n \neq 32$ since the storage times for the data transmitted in the send and receive sides always supplement each other to form the pulse frame duration.

As indicated hereinabove, and as is well known, the timing circuit shown must be supplemented by a conventional space division switching matrix stage. This can be realized such that for each storage word shift register block B1 to Bn there are provided several pairs of switches, of which one pair is selected for the pairs of switches as a function of an address transferred in addition to the time-slot address.

The preferred embodiment of the invention described hereinabove is intended only to be exemplary of the principles of the invention. It is contemplated that the construction and operation of the described embodiment can be changed or modified in a variety of ways while remaining within the scope of the invention, as defined by the appended claims.

I claim:

1. Timing apparatus for pulse code modulation, time division multiplex (PCM/TDM) switching networks in a TDM telecommunication system wherein for each call the same time slot is used on incoming and outgoing PCM/TDM trunks, said timing apparatus including a number of word-organized storage locations equal to the number of PCM words per sampling pulse frame and an equal number of address memory locations, individually assigned to word-organized storage locations, for storing the addresses of the time slots during which PCM information words stored temporarily in word-organized storage locations will be retransmitted, the timing apparatus comprising:

first shift register means comprising a number of series-connected blocks of bistable stages, said blocks, respectively, forming said word-organized storage locations, means connecting an input of the first in the series sequence of said first shift register blocks to incoming conductors of a PCM/TDM trunk and means connecting an output of the last in the series sequence of said first shift register blocks to outgoing conductors of the PCM/TDM trunk, a pair of simultaneously actuated switches interposed between each succeeding pair of blocks of said first shift register means, each of said switches having a control input, the output of a block being connected to an input of the next succeeding block when the switches constituting the pair interposed therebetween are in their non-operating positions, service trunk means having incoming and outgoing conductors one of said switches in each said pair, when in its operating position, connecting an output of a said block of said first shift register means to an outgoing conductor of said service trunk means, the other of said switches of the pair, when in its operating position, connecting an input of the next succeeding block of said first shift register means to an incoming conductor of said service trunk means, second shift register means comprising a number of blocks of bistable stages formed into a series-connected ring for registering a time slot address, a number of bit comparator means, an input of each said block of said second shift register means being connected to an input of a said bit comparator means associated therewith, timing circuit means, common to the address memory locations, carrying a time position code corresponding to the time slot being processed, other inputs of said bit comparator means being connected to said timing circuit means, each said bit comparator means including means for actuating the said control inputs of a said pair of switches coupled thereto when said time position code equals the said time slot address registered in the said block of said shift register means coupled to that bit comparator means, thereby indicating a word-organized storage location and connecting same to said service trunk means.

2. The timing apparatus defined in claim 1 wherein each said bit comparator means comprises:

a comparatar having inputs connected, respectively, to an input of the block of said shift register means associated therewith and to an output of said timing circuit means, integral means, connected to the output of said comparator, and which is set at the start of a said time position code word and reset in the absence of equality between bits being compared in said comparator, and holding register means which is set upon appearance of the last bit of a said time position code word and responsive to a set status of said integral means for causing transmission of a control signal to the control inputs of the said pair of switches connected thereto.

* * * * *